May 10, 1960     M. A. MOSKOVITZ     2,936,188
BALL JOINT ASSEMBLY BEARING CONSTRUCTION
Filed Jan. 20, 1958
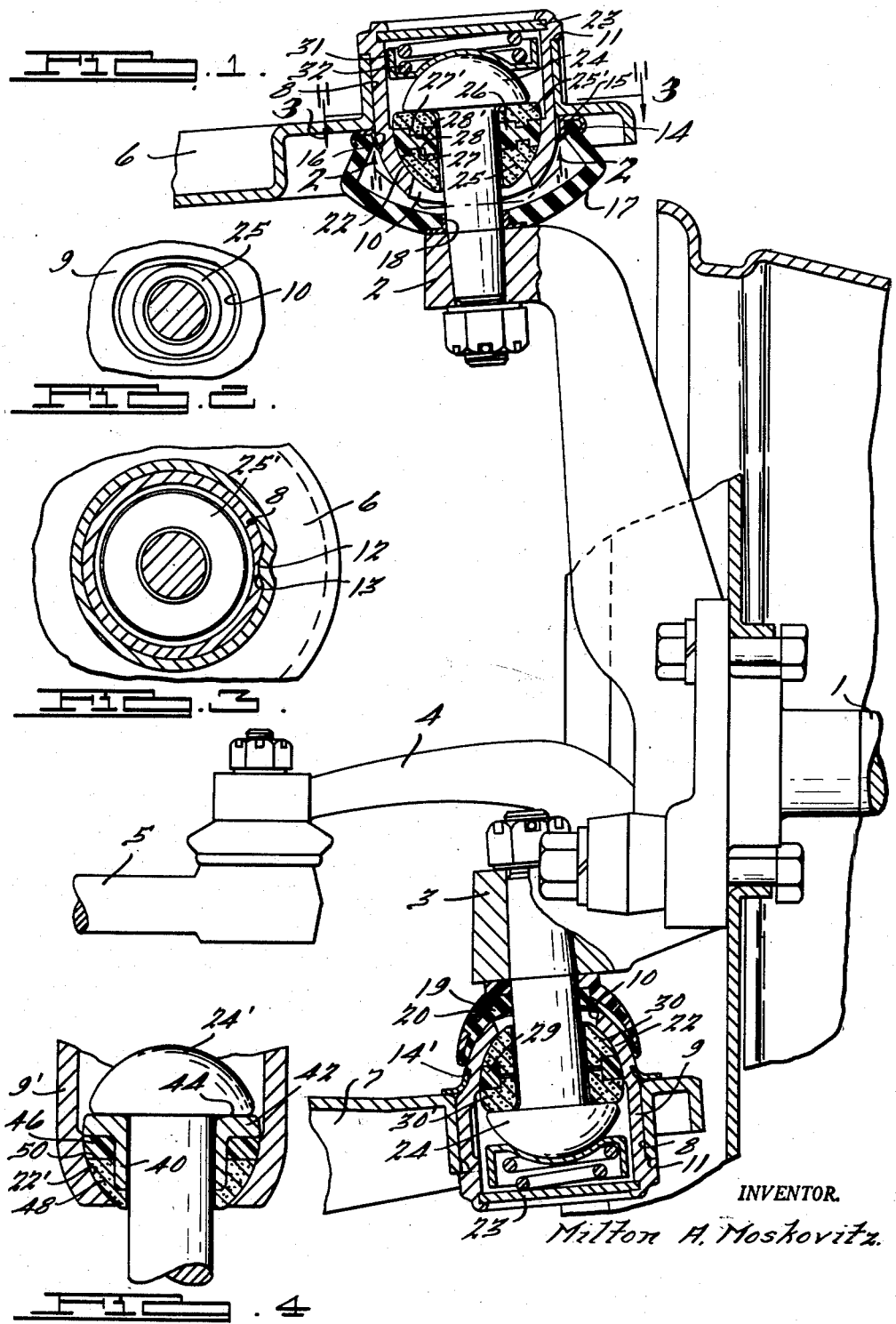
INVENTOR.
Milton A. Moskovitz

United States Patent Office 2,936,188
Patented May 10, 1960

2,936,188

BALL JOINT ASSEMBLY BEARING CONSTRUCTION

Milton A. Moskovitz, Richmond Heights, Mo., assignor of one-half to Harry Frankel, St. Louis, Mo.

Application January 20, 1958, Serial No. 709,865

13 Claims. (Cl. 287—90)

This invention relates to automobile constructions and more especially to an improved ball joint assembly for use in independent steerable wheel suspensions.

This application is a continuation-in-part of my application Serial No. 501,157 filed April 13, 1955, now abandoned.

The invention has among its objects a construction wherein the ball joints may be completely assembled units that are installable or replaceable without requiring disassembling, and wherein the materials that are best suited for specific functions and characteristics are so arranged to insure a long and safe life to the structure.

One of the important objects of my invention is to so construct such a joint as to provide maximum areas of bearing contact, and in which a bearing member shall have its bearing surface of multiple sections of different physical characteristics, and wherein proper lubrication is always assured.

Another object of the invention is to construct a multipart bearing member to include a yieldably expansible plastic part having a lower coefficient of friction than an adjacent part that is of relatively inexpansible material and is rotatable relatively to the latter so as to present fresh wear areas from time to time to thereby prolong the effective life of said bearing member.

Many other objects and advantages of the construction herein shown and described and the uses and advantages mentioned, will be obvious to those skilled in the art to which this invention appertains and as will be apparent from the following specification.

To this end, my invention consists in the novel form, arrangement, construction and combination herein shown and described and as will be more clearly pointed out in the claims hereunto appended.

In the drawings, wherein like reference characters represent like or corresponding parts throughout the views, Figure 1 is a fragmentary vertical elevational view of a portion of the front wheel suspension of a motor vehicle, with parts shown in cross-section;

Figure 2 is a cross-sectional detail, taken substantially along the line 2—2 of Fig. 1;

Figure 3 is a cross-sectional detail, taken substantially along the line 3—3 of Fig. 1; and Figure 4 is a fragmentary cross-sectional view of a modified form of ball-joint bearing construction also suitable for use in an assembly such as that of Fig. 1.

Referring more particularly to the drawings, wherein I have illustrated a preferred embodiment of the invention, there is shown a typical front wheel suspension, as viewed from the rear of the motor-vehicle.

The wheel-supporting spindle 1 has a steering knuckle associated therewith, with upper and lower ends 2 and 3 respectively, and a steering arm 4 for actuating said knuckle, the latter in turn being actuated through pivotal interconnection with a tie-rod end 5 that is controlled by the vehicle operator.

Upper and lower control arms 6 and 7 respectively have annular flanges struck up therefrom to form the eyes 8 transversely through said arms, and said arms are pivotally connected at one end (not shown) to the motor vehicle and are connected at their other ends for universal movement, by ball and socket joints, to the knuckle ends.

Each of said joints is in the form of a cartridge or self-contained unit that is completely assembled and which can be inserted into or removed from said eye without disturbing said assembly of the unit. This unit includes a tubular socket member 9 having a bore axially therethrough, one end 10 of this bore being preferably somewhat oval or in the shape of an ellipse as shown most clearly in Fig. 2.

The socket member may have its exterior of such a size and shape as to be positioned through said eye, preferably by forcibly driving said member axially through said eye opening. A radially outwardly projecting flange or shoulder 11 at one end of the socket member abuts the eye flange at the end of driving movement insertion, and thus limits further insertion movement of said socket member into the eye.

Where the end 10 of the opening is non-circular, as shown, it is necessary to insure that the elongated axis of said opening is positioned in a predetermined angular relationship with the arm, and for this purpose guide or pilot means are provided to act between said socket member and the eye flange so that only when said member is at a predetermined single angular relationship with the arm member, can the socket member be driven home in the eye. For example, one of said cooperating members may be provided with a longitudinally extending rib 12 to be slidably received in a longitudinally extending groove 13 in the other member.

In order to lock the socket member against axial withdrawal after it has been driven home to the properly assembled relationship with the arm eye, the socket member may be provided with a second, outwardly extending flange or shoulder 14 spaced longitudinally from the first flange, said shoulder spaced from the adjacent end of the eye after said socket member has been fully driven home, and forming an annular groove about the exterior of the socket wall between said shoulder 14 and the opposed adjacent control arm face.

A locking ring member having a pair of mutually divergent flanges 15 and 16 at an angle to one another, one of said flanges, flange 15, extending radially outwardly and abutting the adjacent face of the control arm and one end of its eye, and the other flange 16 having a plurality of circumferentially spaced resilient fingers extending radially inwardly at their free ends to form an annular opening thereat that is somewhat smaller than the diameter of the groove seat.

Obviously, after the socket member has been driven home through the eye, and while the locking ring is in place, the fingers of the latter will spring or snap past the shoulder 14 into the groove seat, to lock the socket member against accidental withdrawal axially in one direction. To remove the socket member it is first required that said locking ring be removed in any preferred manner from interlocking engagement with the socket member.

The locking ring shown in connection with the upper control arm has the flange 15 reentrantly bent to provide an annular pocket to receive and interlock with a correspondingly-shaped annular end of a dust seal 17 that is made of a rubber-like material, and will act to hold said dust seal fixed at that end.

The dust seal 17 encloses the open end of said socket member and has an aperture at its other end to receive a sleeve 18 of a relatively inexpansible material such as of nylon interposed thereat to bear against the stud and knuckle, and this sleeve will resist wear much better than the rubber-like material of the seal and therefore increase the period of usefulness of the dust seal.

The other joint may have a like dust seal, or if desired it may differ somewhat and include a rubber-like inner shell 19 to encircle the stud shank and exterior of the socket member, and with an outer shell or sleeve 20 of a different and preferably radially slightly expansible material such as nylon or the like to slidably telescopically receive said inner seal element and fully protect the latter from the elements. The size of the element 20 may be such that it is axially displaced from its initial position upon tightening of the stud nut, to shift said element 20 toward said socket member to the full line position shown. This axial shifting of the element 20 will act to contract the inner compressible shell element 19 to cause the latter to tightly engage the exterior surface of the socket member and improve the sealing thereat.

The socket members of the joints are each provided with a concave bearing surface 22 at the small end of the bore and there may be a closure element 23 across its other end. The stud that forms a part of the joint unit is rotatable and tiltable in the socket opening and has an enlarged head 24 within the socket opening, the shank projecting axially outwardly through said opening.

A rotatable and tiltable bearing member is interposed in the socket between the stud and said concave bearing surface and has a convex exterior for complemental bearing relationship with said concave surface. Instead of making this bearing member or bushing of a single material throughout, with a uniform coefficient of friction at all of its bearing area, I have found it desirable to make best use of several available bearing materials to thereby increase the efficiency and longevity of the bearings.

To this end, I so construct said bearing member that various portions of its bearing exterior surface will have friction coefficients that differ from one another, as for instance by making a pair of axially spaced end bearing sections 25—25' of carburized and hardened copper iron or the like which have the property of being lubricant-impregnable and retaining, but which are substantially inelastic or non-resilient. Intermediate these end sections I interpose the section 26 of a material such as nylon or the like, that is only slightly elastic or expansible under compression and which has a comparatively low coefficient of friction. Initially, said section 26 may be of slightly less diameter than that of the socket bearing surface that it is intended to engage, so that under compression said intermediate bearing section will be radially expanded into bearing engagement with said socket bearing surface.

In order to prolong the effective life of said bearing, the various bearing sections may be rotatable relative to one another. While satisfactory relationships can be established by providing abutting flat face surfaces on the several sections, in the illustrated upper joint the sections are provided with interengaging ribs and grooves, as for example with the ribs 27—27' on the opposed faces of the end sections and annular mating grooves 28—28' on the faces of the intermediate section. Such rib and groove interconnection retains the parts in proper relationship while permitting the adjacent sections to rotate relative to one another, to thereby present fresh bearing areas to the socket bearing surface and to achieve a slower and more uniform wear.

It will be observed that each of the bearing sections 25, 26 and 25' is adapted to engage the bearing surface 22 during the tilting movements. As the stud shank tilts in any one direction, the portion of the element 26 which moves towards the opening in the end 10 will travel over a portion of the bearing surface 22 which has been lubricated by contact with element 25, and on the return of the parts to their illustrated position, that portion of the element 26 will travel over a portion of the bearing surface 22 which has been lubricated by element 25'. Thus, the provision of lubricant-carrying sections on both sides of element 26 possesses the merit of insuring full and adequate lubrication.

One of the advantages of the present multiple-section construction is that the several sections may be constructed with different external diameters if desired. For example, section 25' may be slightly smaller in diameter than section 25 so that section 25' will come into engagement with the bearing surface 22 only after the bearing surface 22 has been lapped and polished by section 25, thus adding a new bearing area to a well seated mating bearing surface.

The lower joint shows a slightly different way of interengaging the nylon bearing section 29 with the end sections 30—30'.

By rounding the peripheral edges of the bearing sections, peripheral grooves are formed between adjacent sections in which lubricant may accumulate and communicate with the opposed faces of the sections to reduce rotary friction thereat.

Although nylon is an excellent bearing material and has a low coefficient of friction, it has a tendency to coldflow under excess loading and to seize or grab in the absence of sufficient lubrication, so that although it is inadvisable to use it alone as the bearing member, yet it performs admirably in association with the other material as herein disclosed, and the oil exuded from the bearing surfaces of the oil-impregnated material will always provide a sufficient oil film to prevent such seizure. The sandwiching of the element 26 between the elements 25 and 25' will control the cold-flow of the nylon section.

If it is desired to pre-load the bearings of the joints, yieldably resilient pressure means, such as the plate 31 and spring 32 may be interposed between the socket closure and the head of the stud.

In the alternative construction illustrated in Fig. 4 of the drawings, a steel sleeve 40 is placed on the shank of the stud and is provided with an annular flange 42 having an upper face 44 adapted to engage the under surface of the stud head 24'. An annular bearing insert 46 of, for example, nylon or a laminated phenolic resin, surrounds a portion of and conforms to the shape of the sleeve 40, the upper surface of the insert 46 abutting the under surface of the flange 42. A lower bearing section 48 is illustrated as being generally cup-shaped, having an inner surface that conforms to the shape of the adjacent portions of sleeve 40, and having a central aperture accepting the stud shank. The upper face 50 of section 48 abuts the under surface of insert 46. Section 48 is preferably formed of porous copper-iron or other similar bearing material having suitable oil retaining properties.

The outer surfaces of sections 46 and 48 generally conform to the shape of bearing surface 22', and the section 42 may also be provided with a similarly curved outer edge if desired (particularly if it is formed of an appropriate bearing material), but in the illustrated arrangement the flange 42 is of a slightly reduced diameter so that it will not normally engage the surface 22'.

As in the arrangement of Fig. 1, the sandwiching of the section 46 between the elements 42 and 48 forces section 46 into proper shape and into proper bearing relationship with surface 22' and effectively prevents coldflow of section 46 if that section be formed of nylon or other plastic materials having cold-flow propensities.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. A ball and socket joint unit comprising a hollow socket member having an internal concave bearing surface at one end, an opening extending through said one end of said member, a stud rotatable and tiltable with respect to said member and having an enlarged head disposed within said hollow socket member and a shank extending through the opening in said member, and a bearing on said shank and having a surface engageable with said concave bearing surface, said bearing comprising axially spaced end sections of oil retaining material and an intermediate plastic section between said end sections.

2. The combination of claim 1 in which there are means urging said bearing toward said concave bearing surface so as to exert axial compressive forces on said intermediate section and in which said intermediate section is radially expansible into engagement with said concave bearing surface when axially compressed.

3. The combination of claim 1 in which said plastic section and said end sections are rotatable relative to one another.

4. The combination of claim 3 in which said plastic section and each of said end sections have mating tongue and groove interconnections.

5. A ball and socket joint unit comprising a hollow socket member having an internal concave bearing surface at one end, an opening extending through said one end of said member, a stud rotatable and tiltable with respect to said member and having an enlarged head disposed within said hollow socket member and a shank extending through the opening in said member, and a bearing on said shank and tiltable and rotatable with respect to said concave bearing surface and having a surface engageable with said concave bearing surface, said bearing comprising a pair of annular members on said shank and abutting one another, a portion of the surface of both of said annular members engaging said concave bearing surface at all positions of said shank relative to said socket member, said annular members being of different materials.

6. A ball and socket joint unit comprising a hollow socket member having an internal concave bearing surface at one end, an opening extending through said one end of said member, a stud rotatable and tiltable with respect to said member and having an enlarged head disposed within said hollow socket member and a shank extending through the opening in said member, and a bearing on said shank and tiltable and rotatable with respect to said concave bearing surface and having a surface engageable with said concave bearing surface, said bearing comprising a pair of annular members on said shank and abutting one another, a portion of the surface of both of said annular members engaging said concave bearing surface at all positions of said shank relative to said socket member, said annular members being of different materials and one of said annular members being porous so as to retain lubricant.

7. A ball and socket joint unit comprising a hollow socket member having an internal concave bearing surface at one end, an opening extending through said one end of said member, a stud rotatable and tiltable with respect to said member and having an enlarged head disposed within said hollow socket member and a shank extending through the opening said member, and a bearing on said shank and tiltable and rotatable with respect to said concave bearing surface and having a surface engageable with said concave bearing surface, said bearing comprising a pair of annular members on said shank and abutting one another, a portion of the surface of both of said annular members engaging said concave bearing surface at all positions of said shank relative to said socket member, said annular members being of different materials and one of said annular members being porous so as to retain lubricant, the other one of said annular members being relatively non-porous and requiring the presence of a lubricant between said surface portion thereof and said concave bearing surface.

8. A ball and socket joint unit comprising a hollow socket member having an internal concave bearing surface at one end, an opening extending through said one end of said member, a stud rotatable and tiltable with respect to said member and having an enlarged head disposed within said hollow socket member and a shank extending through the opening in said member, and a bearing on said shank and tiltable and rotatable with respect to said concave bearing surface and having a surface engageable with said concave bearing surface, said bearing comprising a pair of annular members on said shank and abutting one another, a portion of the surface of both of said annular members engaging said concave bearing surface at all positions of said shank relative to said socket member, said annular members being of different materials and one of said annular members being porous so as to retain lubricant, the other one of said annular members being of plastic material.

9. A ball and socket joint unit comprising a hollow socket member having an internal concave bearing surface at one end, an opening extending through said one end of said member, a stud rotatable and tiltable with respect to said member and having an enlarged head disposed within said hollow socket member and a shank extending through the opening in said member, and a bearing on said shank, said bearing comprising axially spaced end sections and an intermediate section between said end sections, said intermediate section having surfaces abutting said end sections and a surface engaging said concave bearing surface.

10. A ball and socket joint unit comprising a hollow socket member having an internal concave bearing surface at one end, an opening extending through said one end of said member, a stud rotatable and tiltable with respect to said member and having an enlarged head disposed within said hollow socket member and a shank extending through the opening in said member, and a bearing on said shank, said bearing comprising axially spaced end sections and an intermediate section between said end sections, said intermediate section having surfaces abutting said end sections and a surface engaging said concave bearing surface, one of said end sections having a convex exterior surface engaging said concave bearing surface.

11. A ball and socket joint unit comprising a hollow socket member having an internal concave bearing surface at one end, an opening extending through said one end of said member, a stud rotatable and tiltable with respect to said member and having an enlarged head disposed within said hollow socket member and a shank extending through the opening in said member, and a bearing on said shank, said bearing comprising axially spaced end sections and an intermediate section between said end sections, said intermediate section having surfaces abutting said end sections and a surface engaging said concave bearing surface, both of said end sections having convex exterior surfaces engageable with said concave bearing surface during tilting of said shank relative to said concave bearing surface.

12. The combination of claim 5 further including a metallic sleeve surrounding a portion of said shank and disposed between said shank and at least a portion of at least one of said annular members and having a radial flange adjacent said enlarged head.

13. The combination of claim 12 in which the one of said annular members which is adjacent said radial flange is of a plastic material in which the other one of said annular members is of an oil retaining metallic material.

References Cited in the file of this patent

UNITED STATES PATENTS 2,521,335    Booth  ---------------- Sept. 5, 1950

(References on following page)

UNITED STATES PATENTS

| | | |
|---|---|---|
| 2,523,367 | Holt | Sept. 26, 1950 |
| 2,553,743 | Booth | May 22, 1951 |
| 2,569,823 | Moskovitz | Oct. 2, 1951 |
| 2,593,253 | Booth | Apr. 15, 1952 |
| 2,645,510 | Booth | July 14, 1953 |
| 2,686,070 | Booth | Aug. 10, 1954 |
| 2,755,116 | Alldredge | July 17, 1956 |
| 2,823,055 | Booth | Feb. 11, 1958 |

FOREIGN PATENTS

| | | |
|---|---|---|
| 231,715 | Great Britain | Apr. 9, 1925 |